United States Patent [19]

Kurokawa et al.

[11] Patent Number: 4,652,002
[45] Date of Patent: Mar. 24, 1987

[54] STEERING SYSTEM FOR A MOTOR VEHICLE

[75] Inventors: Ryogo Kurokawa, Ohizumimachi; Fusami Oyama, Ohramachi; Akira Takahashi; Kenji Hirose, both of Ohta, all of Japan

[73] Assignee: Fuji Jukogyo Kabushiki Kaisha, Tokyo, Japan

[21] Appl. No.: 807,572

[22] Filed: Dec. 11, 1985

[30] Foreign Application Priority Data

Dec. 20, 1984 [JP] Japan .................................. 59-269369
Dec. 20, 1984 [JP] Japan .................................. 59-269370

[51] Int. Cl.⁴ .............................................. B62D 5/04
[52] U.S. Cl. .................................................. 180/79.1
[58] Field of Search ...................... 180/79.1, 140, 142, 180/143

[56] References Cited

U.S. PATENT DOCUMENTS

| 3,280,931 | 10/1966 | Cahill et al. | 180/79.1 X |
| 4,441,572 | 4/1984 | Ito et al. | 180/79.1 X |
| 4,538,698 | 9/1985 | Hashimoto et al. | 180/143 X |
| 4,566,710 | 1/1986 | Furukawa et al. | 180/140 |

FOREIGN PATENT DOCUMENTS 59-26363 10/1984 Japan .

Primary Examiner—John A. Pekar
Attorney, Agent, or Firm—Martin A. Farber

[57] ABSTRACT

A steering system for rear wheels of a motor vehicle is provided with a motor for changing the steering angle of the rear wheels and an electric control unit. The control unit produces a desired steering angle signal dependent on the speed of the vehicle and compares the actual steering angle of the rear wheels with the desired steering angle signal. A control signal dependent on the result of the comparison is applied to a driver which drives the motor so that the steering angle of the rear wheels coincides with the desired steering angle.

6 Claims, 7 Drawing Figures

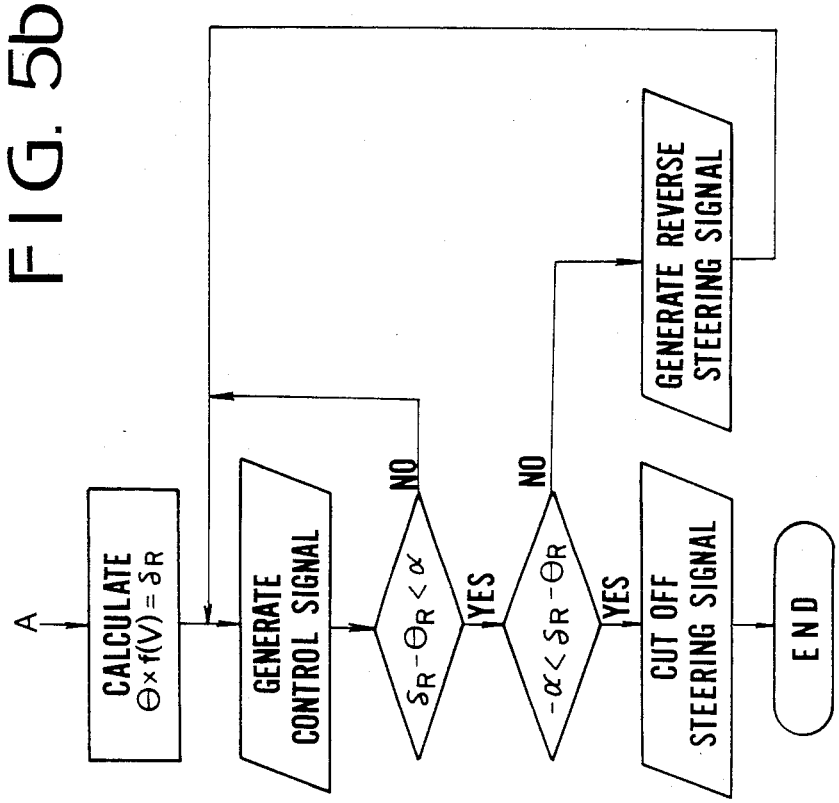

STEERING SYSTEM FOR A MOTOR VEHICLE

BACKGROUND OF THE INVENTION

The present invention relates to a system for steering both front and rear wheels of a motor vehicle.

Such a system is, for example, disclosed in Japanese Patent Laid Open 59-26363, in which the rear wheels are rotatable about king pins in synchronism with the steering of the front wheels. In the prior art, the steering system for the rear wheels is operatively connected to the steering system of the front wheels by a mechanical transmitting system, so that the rear wheels are steered in dependency on the steering operation of the front wheels.

The steering direction and steering angle of the rear wheels are changed in accordance with the speed of the vehicle. For example, in a low vehicle speed range, the rear wheels are rotated about the king pins in a direction opposite to the direction of the front wheels, so that the vehicle can be turned at a small radius. At a high vehicle speed, the rear wheels are rotated in the same direction as the front wheels so as to improve the response to steering wheel operation by the driver.

Accordingly, the mechanical transmitting system must be provided with a change-speed device for changing the transmission ratio and a mechanism for changing the steering direction of the rear wheels. As a result, the system becomes very complicated in construction, large in size and expensive.

SUMMARY OF THE INVENTION

The object of the present invention is to provide a steering system which eliminates above-described disadvantages in a conventional mechanical steering system.

According to the present invention, there is provided a steering system for a motor vehicle comprising an electric motor operatively connected to the rear wheels of the vehicle for changing the steering angle of the rear wheels, a front wheel steering angle sensor responsive to the angular displacement of the front wheels of the vehicle for producing a front wheel steering angle signal, a rear wheel steering angle sensor responsive to the angular displacement of the rear wheels for producing a rear wheel steering angle signal, and a vehicle speed sensor for producing a vehicle speed signal dependent on the speed of the vehicle.

A control unit comprises first means responsive to the front wheel steering angle signal and vehicle speed signal for producing a desired steering angle signal representing a desired steering angle for the rear wheels, and second means for comparing the rear wheel steering angle signal with the desired steering angle signal and for producing a control signal dependent on the difference between the signals. A driver is responsive to the control signal for producing a driving output for driving the motor so that the steering angle of the rear wheels coincides with the desired steering angle.

The other objects and features of this invention will become understood from the following description with reference to the accompanying drawings.

BRIEF DESCRIPTION OF DRAWINGS

FIGS. 5a and 5b are flowcharts showing the operation of the steering system.

DETAILED DESCRIPTION OF THE PREFERRED EMBODIMENT

Figure 1:
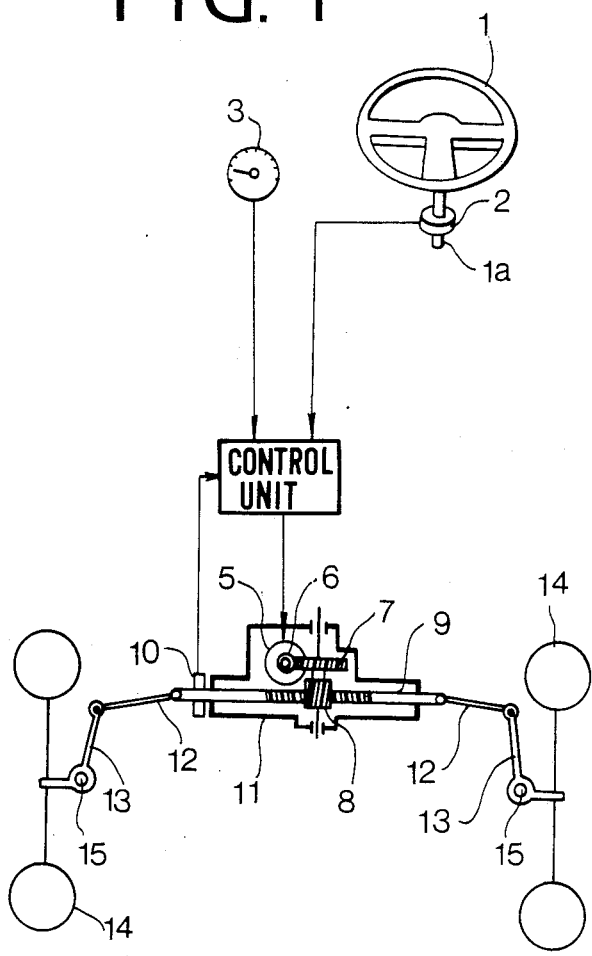
FIG. 1 is a schematic view showing a steering system according to the present invention.
Figure 2:
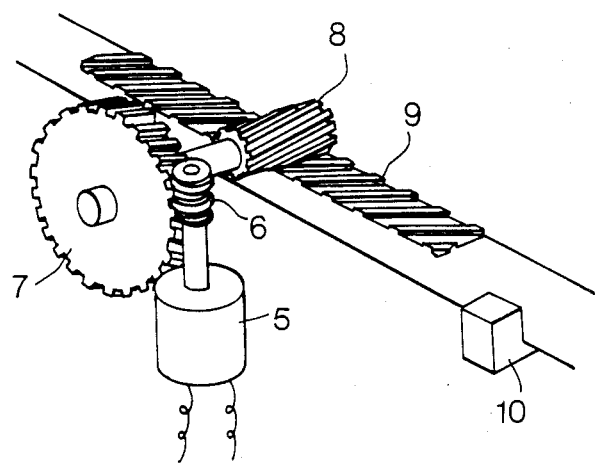
FIG. 2 is a perspective view showing a part of a steering system for rear wheels.

Referring to FIG. 1, a steering wheel 1 is operatively connected to front wheels of a vehicle through a known front wheel steering system (not shown) such as a rack-and-pinion steering system. A front wheel steering angle sensor 2 is provided adjacent a steering shaft 1a so as to detect the angle of rotation of the steering shaft and to produce a steering angle signal proportional to the angle of the rotation or to the angle of the front wheels, including the direction of the rotation. A control unit 4 is applied with the steering angle signal and with a vehicle speed signal from a vehicle speed sensor 3.

An electric motor 5 is provided in a rear wheel steering system. The rotary shaft of the motor 5 is provided with a worm 6 which engages with a worm wheel 7. The shaft of the worm wheel 7 has a pinion 8 which is engaged with a rack 9. These parts 5, 6, 7 and 8 are provided in a gear box 11 and the rack 9 is slidably mounted in the gear box 11. Both ends of the rack 9 are operatively connected to knuckle arms 13 through the rods 12 so as to rotate rear wheels 14 of the vehicle about king pins 15.

The worm and worm wheel mechanism has a small lead angle so as to form a one-way transmitting mechanism to prevent transmitting of torque from the rear wheels 14 to the motor 5. A rear wheel steering angle sensor 10 is provided adjacent the rack 9 so as to detect the displacement of the rack which represents the angle of the rear wheels. The output of the sensor 10 is fed to the control unit 4.

The control unit 4 calculates a desired steering angle for the rear wheels based on the front wheel steering angle signal from the sensor 2 and on the vehicle speed signal from the vehicle speed sensor 3. The rear wheel steering angle signal from the sensor 10 is compared with the desired steering angle, and the difference between both signals is computed and a control signal is generated from the control unit. The control signal is, for example, in the form of pulses and is applied to the motor 5 to drive it, so that the rear wheels are rotated so as to coincide with the desired steering angle.

Figure 3:
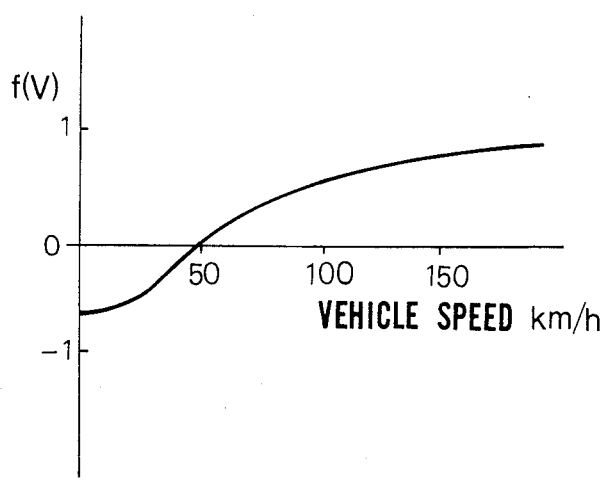
FIG. 3 is a graph showing the relationship between vehicle speed and steering angle of the rear wheels.

The desired steering angle $\delta R$ can be expressed as follows $$\delta_R = \theta \cdot f(V)$$

where $\theta$ is a steering angle of the front wheels and V is vehicle speed. The function f(V) has a value as shown in FIG. 3, which is negative below a predetermined vehicle speed of about 50 Km/H and increases with an increase of the vehicle speed to approach "+1".

Figure 4:
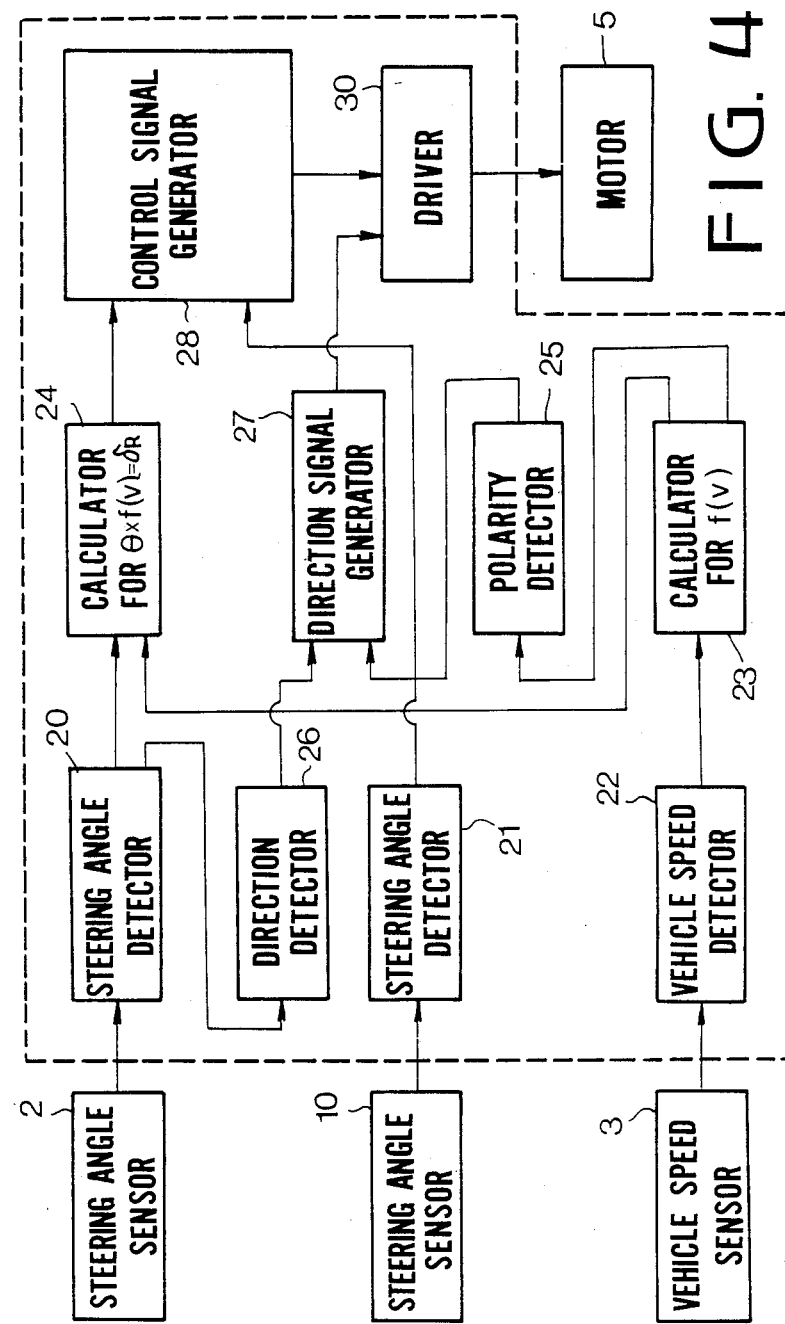
FIG. 4 is a block diagram of a control unit.
Figure 5A:
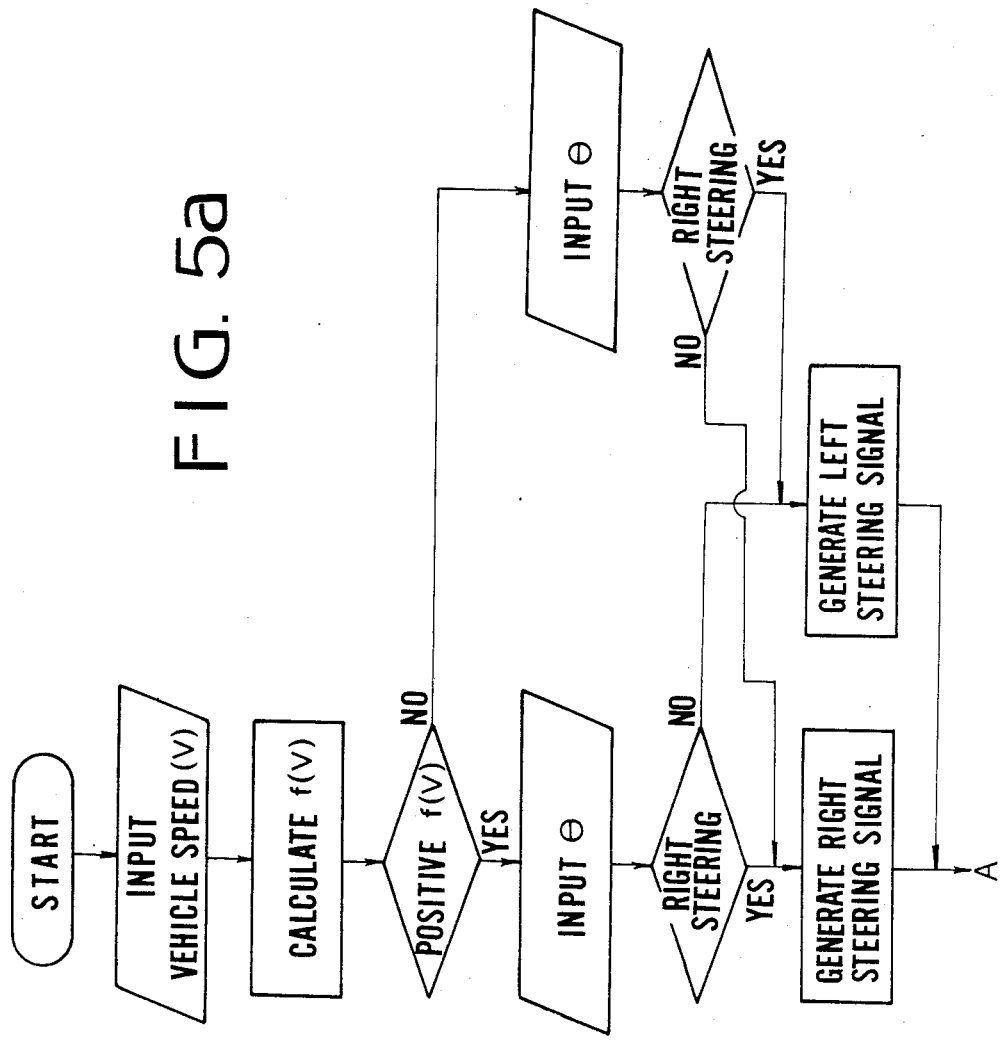
Figure 6:
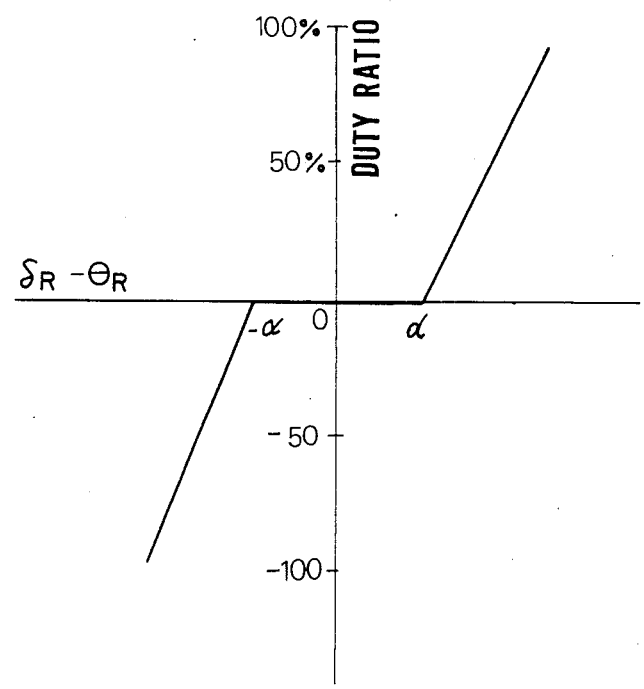
FIG. 6 is a graph showing duty ratio of driving pulses.

Referring to FIG. 4, the outputs of the steering angle sensors 2 and 10 are applied to front steering angle ($\theta$) detector 20 and rear steering angle ($\theta_R$) detector 21, and the output of vehicle speed sensor 3 is applied to a vehicle speed detector 22, respectively. The output of the detector 22 is applied to a function calculator 23 for producing function f(V) which is applied to a calculator 24 and a polarity detector 25. The calculator 24 calculates the desired steering angle $\delta_R$ based on the outputs of the detector 20 and calculator 23. The detector 25 determines whether the function f(V) is positive or negative and produces an output signal dependent the determination. On the other hand, the output of the detector 20 is applied to a steering direction detector 26 where the direction of the front wheel steering is detected. The output signals of the detectors 25 and 26 are applied to a direction signal generator 27 which generates a rotational direction signal dependent on the iput signals. The output singals of the calculator 24 and detector 21 are applied to a control signal generator 28 where the difference between the desired steering angle $\delta_R$ and the rear steering angle $\theta_R$ is obtained and a control signal dependent on the difference ($\delta_R - \theta_R$) is produced. There is provided a tolerance ($\alpha$) for the difference. When the difference exceeds the tolerance $\pm \alpha$, the generator 28 generates the control signal. A driver 30 is applied with the control signal and rotational direction signal of the generator 27 to produce motor drive pulses, the duty ratio of which is determined in accordance with the difference ($\delta_R - \theta_R$) as shown in FIG. 6. Thus, the motor 5 is driven by the pulses in a direction determined by the direction signal to rotate the rear wheels about the king pins 15. FIG. 5 shows the above-described operation of the system.

In accordance with the present invention, the rear wheels are rotated about the king pins by an electric motor, and the motor operation is controlled in dependency on vehicle speed and the steering angle of the front wheels. Accordingly, the system is very simple in construction and the steering can be properly controlled.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A steering system for a motor vehicle having steerable front and rear wheels comprising:
   means comprising an electric motor operatively connected to the rear wheels of the vehicle for changing the steering angle of the rear wheels;
   a front wheel steering angle sensor responsive to angular displacement of the front wheels of the vehicle for producing a front wheel steering angle signal;
   a rear wheel steering angle sensor responsive to the angular displacement of the rear wheels for producing a rear wheel steering angle signal;
   a vehicle speed sensor for producing a vehicle speed signal dependent on the speed of the vehicle;
   first electric means responsive to the front wheel steering angle signal and vehicle speed signal for producing a desired steering angle signal representing a desired steering angle for the rear wheels;
   second electric means for comparing the rear wheel steering angle signal with the desired steering angle signal for producing a control signal dependent on the difference between the rear wheel steering angle and the desired steering angle signals;
   drive means responsive to the control signal for producing a driving output for driving the electric motor so that the steering angle of the rear wheels coincides with the desired steering angle; and
   means for preventing the motor from receiving torque from the rear wheels.

2. The steering system according to claim 1 wherein the driving output is in the form of pulses, the duty ratio of which varies in accordance with the difference between the rear wheel steering angle and the desired steering angle signals.

3. The steering system according to claim 1 further comprising third means responsive to the vehicle speed signal for determining the direction of the rear wheels.

4. The steering system according to claim 1 wherein said preventing means comprises a one-way transmitting means for transmitting torque of the motor to said rear wheels but for prevent the torque from the rear wheels from acting torquewise on the motor.

5. The steering system according to claim 4, wherein said one-way transmitting means comprises a worm connected to a rotary shaft of the motor, and a worm wheel engaging said worm and operatively connected to the rear wheels.

6. The steering system according to claim 5, wherein said worm and worm wheel having a small lead angle.

* * * * *